United States Patent
Huxley-Reynard et al.

(10) Patent No.: US 8,459,945 B2
(45) Date of Patent: Jun. 11, 2013

(54) UNDERWATER STRUCTURES

(75) Inventors: Christopher Shane Huxley-Reynard, Bristol (GB); Paul Vigars, Bristol (GB)

(73) Assignee: Tidal Generation Limited, Bristol (GB)

( * ) Notice: Subject to any disclaimer, the term of this patent is extended or adjusted under 35 U.S.C. 154(b) by 656 days.

(21) Appl. No.: 12/596,331

(22) PCT Filed: Apr. 24, 2008

(86) PCT No.: PCT/GB2008/001482
§ 371 (c)(1),
(2), (4) Date: Oct. 16, 2009

(87) PCT Pub. No.: WO2008/129311
PCT Pub. Date: Oct. 30, 2008

(65) Prior Publication Data
US 2010/0129221 A1    May 27, 2010

(30) Foreign Application Priority Data

Apr. 24, 2007 (GB) .................................. 0707909.8

(51) Int. Cl.
*F01D 25/28* (2006.01)
(52) U.S. Cl.
USPC .................. 416/9; 416/244 R; 416/DIG. 6
(58) Field of Classification Search
USPC ............... 415/4.3, 4.5, 123, 129, 908; 416/9, 416/244 R, DIG. 6; 290/43, 54; 248/229.13, 248/229.23, 62, 74.1; 285/406, 407, 409, 285/410, 411, 413, 920; 403/331, 338
See application file for complete search history.

(56) References Cited

U.S. PATENT DOCUMENTS

| | | | | |
|---|---|---|---|---|
| 3,661,408 A | * | 5/1972 | Gibbons | 285/18 |
| 4,660,869 A | * | 4/1987 | Gabus | 285/365 |
| 7,458,776 B2 | * | 12/2008 | LLorente Gonzalez et al. | 416/9 |
| 7,795,750 B2 | * | 9/2010 | Perner et al. | 290/54 |
| 2004/0108010 A1 | * | 6/2004 | Gaston et al. | 138/99 |
| 2006/0156681 A1 | * | 7/2006 | Fernandez Gomez et al. | 52/721.1 |
| 2008/0056906 A1 | | 3/2008 | Gray et al. | |
| 2010/0129221 A1 | * | 5/2010 | Huxley-Reynard et al. | 416/169 R |

FOREIGN PATENT DOCUMENTS

| | | | |
|---|---|---|---|
| FR | 481.058 | | 10/1916 |
| GB | 2311566 A | * | 10/1997 |
| GB | 2 409 885 A | | 7/2005 |
| GB | 2 431 207 A | | 4/2007 |
| GB | 2 431 628 A | | 5/2007 |
| JP | 2006-70797 | | 3/2006 |
| WO | WO 97/11301 | | 3/1997 |
| WO | WO 2004/015264 A1 | | 2/2004 |
| WO | WO 2005/057006 A1 | | 6/2005 |

(Continued)

OTHER PUBLICATIONS

United Kingdom Search Report corresponding to Application No. GB0707909.8, dated Aug. 20, 2007.

(Continued)

*Primary Examiner* — Edward Look
*Assistant Examiner* — Christopher R Legendre
(74) *Attorney, Agent, or Firm* — Oliff & Berridge, PLC

(57) ABSTRACT

An underwater structure includes a power generation apparatus and a supporting structure. A coupling is provided that allows attachment of the power generating device to the submerged support structure. The coupling incorporates the function of a yaw bearing allowing rotation of the power generating apparatus about a substantially vertical axis.

22 Claims, 10 Drawing Sheets

FOREIGN PATENT DOCUMENTS

| WO | WO 2007051968 A1 | * | 5/2007 |
| WO | WO 2008041837 A1 | * | 4/2008 |
| WO | WO 2012038309 A2 | * | 3/2012 |

OTHER PUBLICATIONS

International Search Report corresponding to International Application No. PCT/GB2008/001482, mailed Feb. 11, 2009.

Data supplied from the espacenet database—Worldwide indicating that English translation of abstract of FR481058 (A) is not available.

English translation of abstract of Japan Publication No. 2006-070797.

* cited by examiner

UNDERWATER STRUCTURES

FIELD OF THE INVENTION

The present invention relates to underwater structures, and, in particular, to clamping mechanisms for underwater structures.

BACKGROUND OF THE INVENTION

Underwater structures, particularly water current and wave power generating devices, are subjected to significant mechanical loads due to the action of water current and waves. These loads must be reacted through a support structure or mooring into an underwater surface, such as the seabed. Some power generation devices are designed to orientate themselves with respect to the oncoming water current or wave direction in order to maximise the power that they are able to generate and/or minimise any adverse interactions between generation apparatus and support structure. Ideally, the generation apparatus and support structure should be connected together by a mechanical connection, or clamping mechanism, that is capable of:

i) opposing the significant mechanical loads;
ii) providing the necessary degree of mechanical freedom to allow re-orientation of the device with respect to the current/wave direction; and
iii) allowing the power generating equipment to be detached from the support structure for maintenance.

The following patent applications illustrate previously considered techniques for attachment of equipment to underwater support structures.

GB2348249 "Submersible Water Flow Turbine with Buoyancy Chamber", John Armstrong. This is an example of a water current generating turbine which orientates itself with respect to the oncoming current direction about a bearing on the seabed.

WO2005/061887 A1 "Articulated False Bed", Marine Current Turbines Ltd. This describes a system for attaching a fixed yaw tidal turbine to the seabed.

WO 2004/015264 A1 "Guiding Apparatus for Subsea Modules, a Method and a Foundation". This describes an alternative method for connecting a tidal turbine to a foundation.

WO9711301 "Clamp Connector Arrangement", Vector International Ltd. This describes a hinged pipe clamping mechanism as commonly used to clamp lengths of subsea pipeline together. The specific design of the hinged clamping mechanism described in this patent could be adapted in order to perform the combined functions described in the current invention.

SUMMARY OF THE INVENTION

According to one aspect of the present invention, there is provided an underwater structure comprising a support structure, a power generating apparatus, and a coupling which is operable to clamp the power generating apparatus to the support structure, and which is adapted to allow rotation of the power generating apparatus with respect to the support structure about a substantially vertical axis thereof, and to transfer all other mechanical loads from the power generating apparatus to the support structure when the power generating apparatus is clamped to the support structure, and which is operable to release the power generating apparatus from the support structure.

According to another aspect of the present invention, there is provided a coupling for clamping a power generating apparatus to an underwater support structure, the coupling being adapted to allow, when in use, rotation of the power generating apparatus with respect to the support structure about a substantially vertical axis thereof, and to transfer all other mechanical loads from the power generating apparatus to the support structure when the power generating apparatus is clamped to the support structure, and which is operable to release the power generating apparatus from the support structure.

According to another aspect of the present invention, there is provided a coupling for clamping a power generating apparatus to an underwater support structure, the coupling comprising an attachment portion for attaching the coupling to a power generating apparatus, an engagement portion adapted for slidable engagement with a locating portion of a support structure, and a clamp mechanism movable between a release position in which, in use, the power generating apparatus and the support structure are releasable from one another, and an engaged position in which, in use, the power generating apparatus and the support structure are not substantially releasable from one another.

Embodiments of the present invention can provide apparatus for the attachment and detachment of a normally submerged water current or wave power generating apparatus (PGA) to/from a submerged support structure or foundation, consisting of a mating feature or features on the PGA and support structure and a detachable coupling.

When engaged with the mating features on the PGA and support structure, the detachable coupling forms a yaw bearing, allowing rotation of the PGA relative to the support structure about a substantially vertical axis, such rotation being provided for the purposes of orientating the PGA with respect to the oncoming water current or wave direction.

When disengaged the detachable coupling allows the PGA to be freely detached from the support structure so that the PGA can be recovered to the surface and subsequently re-attached to the support structure when desired.

During connection and disconnection of the PGA to/from the support structure, the detachable coupling is insensitive to orientation of the PGA about a substantially vertical axis, and tolerant to some lateral misalignment and angular misalignment about a horizontal axis.

The detachable coupling consists of one or more movable elements mounted on the PGA which can be individually or collectively actuated to engage in a substantially radial sense with the mating feature or features on the PGA and support structure.

BRIEF DESCRIPTION OF THE DRAWINGS

For a better understanding of the present invention, and to show more clearly how it may be carried into effect, reference will now be made, by way of example only, to the following drawings, in which.

DETAILED DESCRIPTION OF THE PREFERRED EMBODIMENTS

Figure 1A:
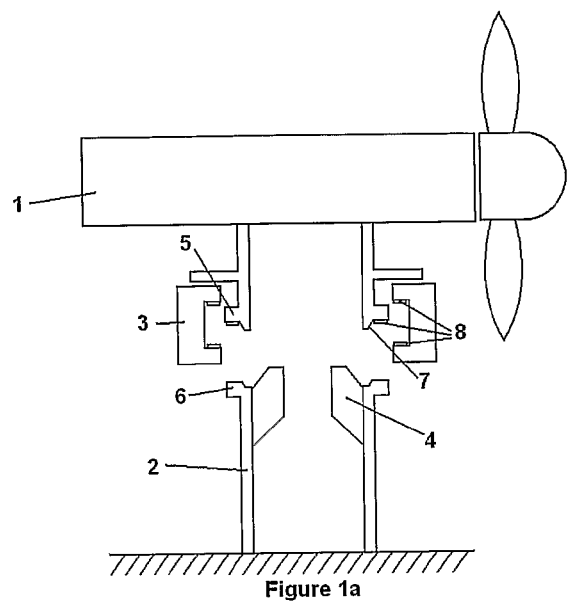
FIGS. 1a, 1b and 1c illustrate a first embodiment of the present invention.
Figure 1B:
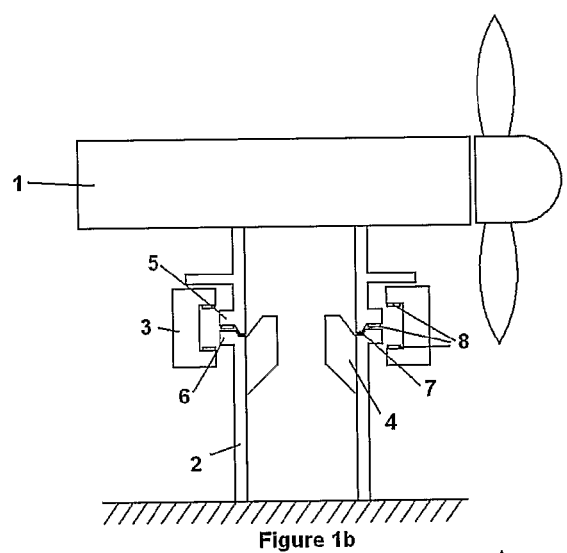
Figure 1C:
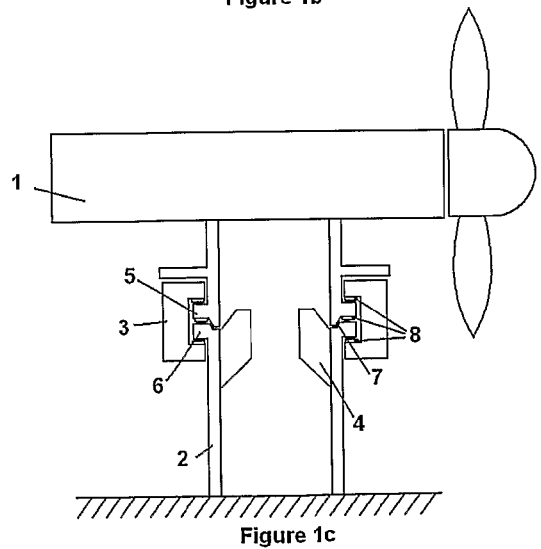

FIGS. 1a, 1b and 1c show respective cross sectional views through an underwater current turbine device. The underwater device comprises a power generating apparatus (PGA) 1, and a support structure 2. The support structure 2 is mounted on an underwater surface, such as a seabed or riverbed. Although a current turbine device is shown and described in the following, it should be understood that the principles of the present invention are applicable also to wave power generation devices. FIG. 1a shows the PGA 1 positioned above the support structure 2, ready to be connected thereto. The PGA 1 could be supported by a crane (not shown) or could be positively buoyant and connected to the support structure by a winch. The PGA 1 is manoeuvred into place on the support structure 2, the result of which is illustrated in FIG. 1b. In this first embodiment of the present invention, fixed alignment guides 4 mounted to the support structure help to guide the PGA 1 into place. The fixed alignment guides 4 are provided in order to make the process of locating the PGA 1 on the support structure 2 more tolerant to horizontal misalignments and/or angular misalignment about a substantially horizontal axis. The PGA 1 has mating features 5 which releasably engage with corresponding mating features 6 of the support structure 2.

In FIG. 1c, a coupling or clamping mechanism 3 is activated in order to hold the PGA 1 in place on the support structure 2. The coupling is made up of moveable elements (or clamping portions) 3 which are supported by the PGA 1, as illustrated in FIG. 1a.

FIG. 1b shows the PGA 1 located on the support structure 2 with the moveable elements 3 in a release position, that is, a disengaged position in which the PGA 1 and support structure 1 can be moved apart from one another. In FIG. 1c the moveable elements 3 of the coupling have been actuated radially inwards by an actuator (not shown for clarity) to an engaged position. The moveable elements 3 hold the PGA 1 and support structure 2 mating features 5 and 6 together to prevent the PGA 1 becoming detached from the support structure 2. Clearance is provided between the moveable elements 3 and the mating features 5 and 6, in order that the PGA 1 is able to rotate relative to the support structure 2. The coupling thereby acts as a yaw bearing. A lip 7 on the base of the PGA mating feature 5 serves to react horizontal forces acting on the PGA 1 into the support structure 2. This relieves the coupling of such mechanical loads. Low friction bearing liners 8 are provided on the PGA and support structure mating features 5 and 6 to reduce the frictional resistance and wear of the yaw bearing during engagement of the detachable coupling, as well as during rotation of the yaw bearing. These bearing liners could be made from low friction material, such as a Nylon based or fibre matrix material.

Figure 2A:
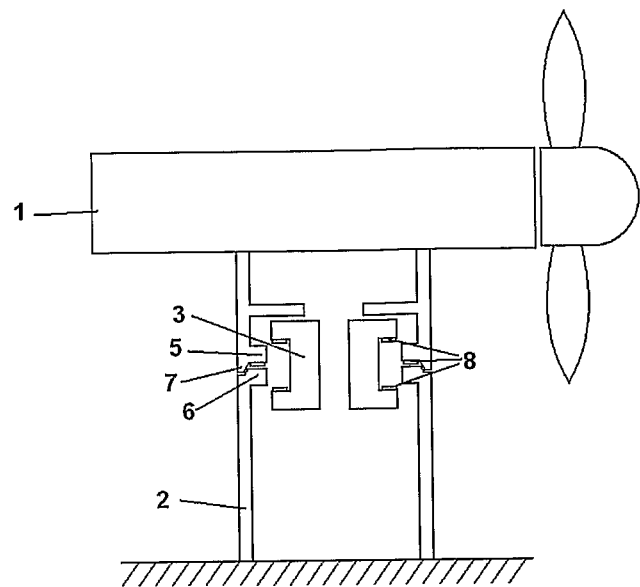
FIGS. 2a and 2b illustrate a second embodiment of the present invention.
Figure 2B:
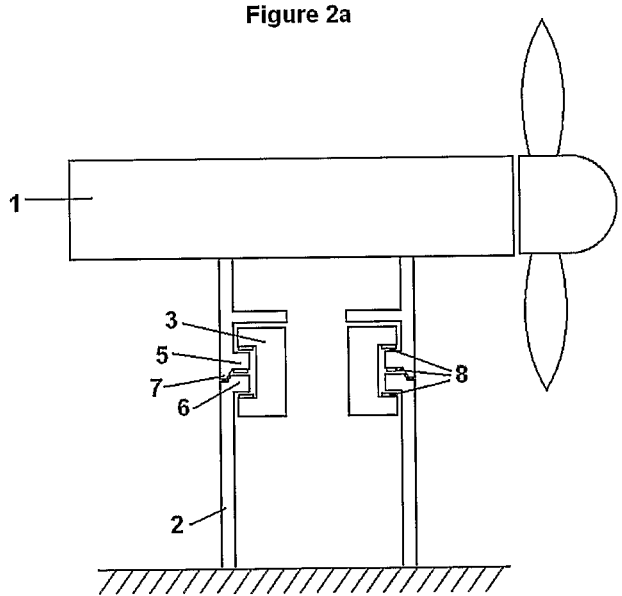

FIGS. 2a and 2b illustrate respective cross sections of a second embodiment in which the moveable elements 3 are located inside the PGA 1, and are actuated radially outwards to secure the coupling. FIG. 2a shows the PGA 1 mounted on the support structure 2 with the moveable elements 3 in the release position, that is disengaged. In FIG. 2b, the moveable elements 3 have been actuated radially outwards to the engaged position to secure the coupling.

Figure 3A:
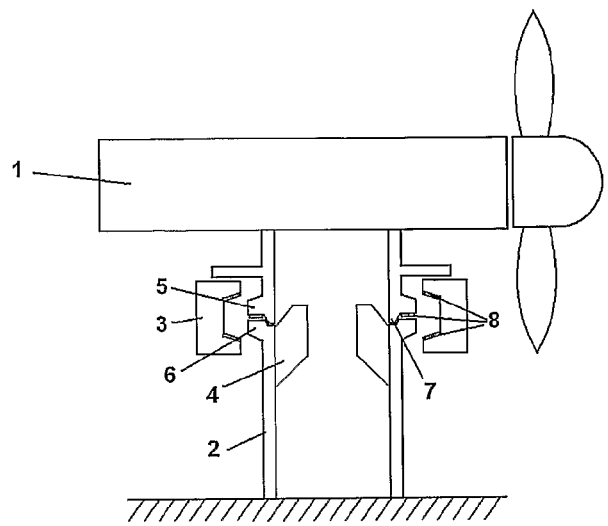
FIGS. 3a, 3b, and 3c illustrate a third embodiment of the present invention.
Figure 3B:
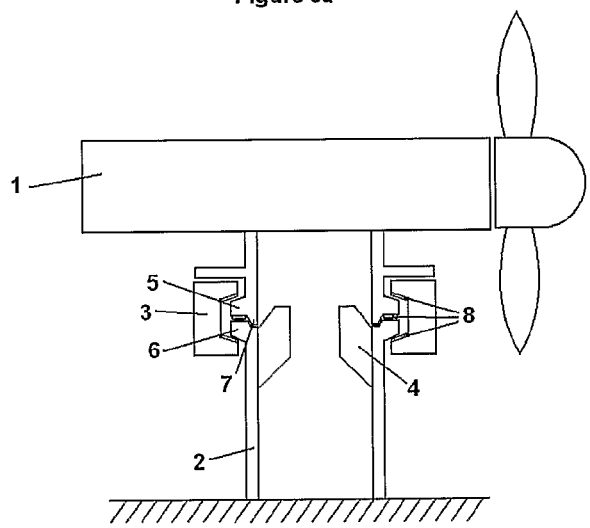
Figure 3C:
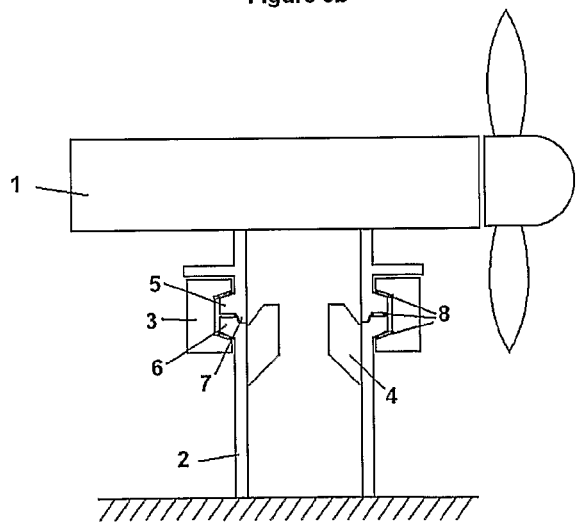

FIGS. 3a, 3b, and 3c show respective cross sections of a third embodiment in which the moveable elements 3 perform the dual function of a yaw bearing and, upon further tightening of the actuators, a friction brake to prevent the yaw bearing rotating about the vertical axis. In FIG. 3a the PGA 1 is mounted on the support structure 2 with the moveable elements 3 disengaged. In this embodiment, the moveable elements 3 and the mating features 5 and 6 on the PGA 1 and support structure 2 are tapered. In FIG. 3b the moveable elements 3 have been actuated radially inwards (actuator not shown) such that there remains sufficient clearance between the mechanical elements 3 and the mating features on the PGA 5 and support structure 6 for the yaw bearing to turn freely. In FIG. 3c, the coupling has been tightened by further actuation of the moveable elements 3 radially inwards, such that tapered faces of the moveable elements 3 bear against corresponding faces on the mating features 5 and 6 to create a preload in the coupling. This preload provides the desired friction between mating features 5 and 6 to prevent the PGA 1 rotating about a substantially vertical axis of the support structure 2.

An alternative embodiment of the arrangement described in FIGS. 3a, 3b, and 3c would incorporate key features on the moveable elements 3 which engage with key features on the PGA 1 and/or support structure 2 in order to lock the PGA 1 and prevent the yaw bearing from rotating (key features not shown). Mating features 5 and 6 would not have to be tapered in such a case, as the moments applied about the vertical axis would be reacted by the key features rather than by friction between the mating features.

Figure 4A:
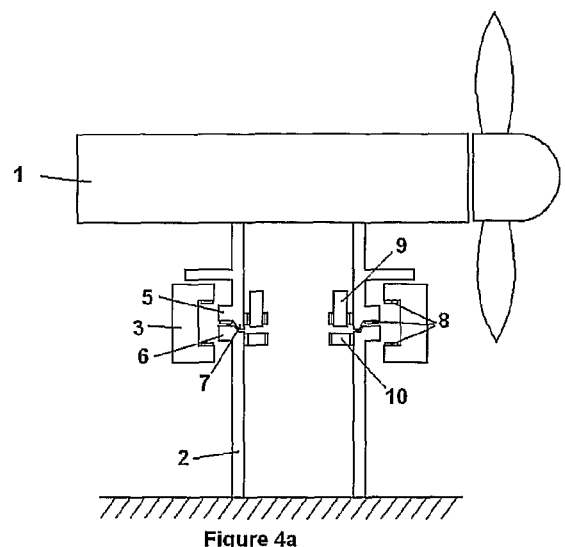
FIGS. 4a, 4b, and 4c illustrate a fourth embodiment of the present invention.
Figure 4B:
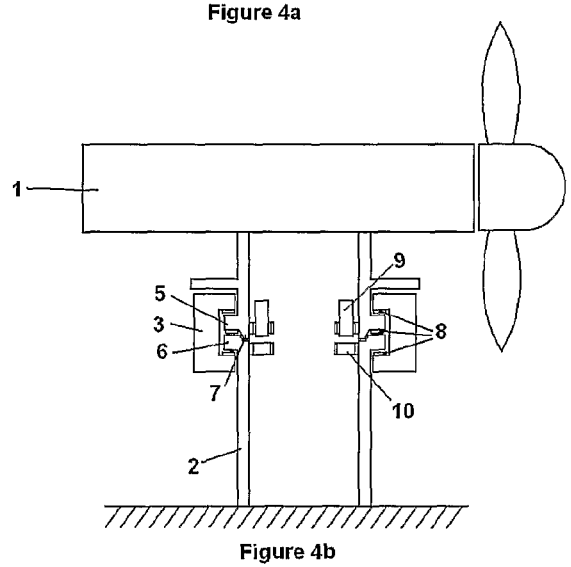
Figure 4C:
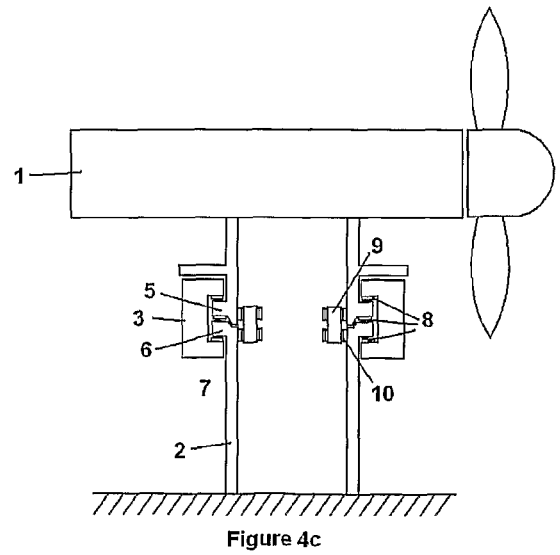

FIGS. 4a, 4b, and 4c show respective cross sections of a fourth embodiment in which additional locking pins 9 are employed to prevent the yaw bearing rotating about the vertical axis. In FIG. 4a, the PGA 1 is mounted on the support structure 2 with the moveable elements 3 disengaged and the locking pins 9 disengaged. In FIG. 4b, the moveable elements 3 have been actuated radially inwards to engage the coupling (actuator not shown). In FIG. 4c the locking pins 9 have been engaged with features 10 on the support structure such that the PGA and support structure mating features 5 and 6 are prevented from rotating relative to one another about the vertical axis.

Figure 5A:
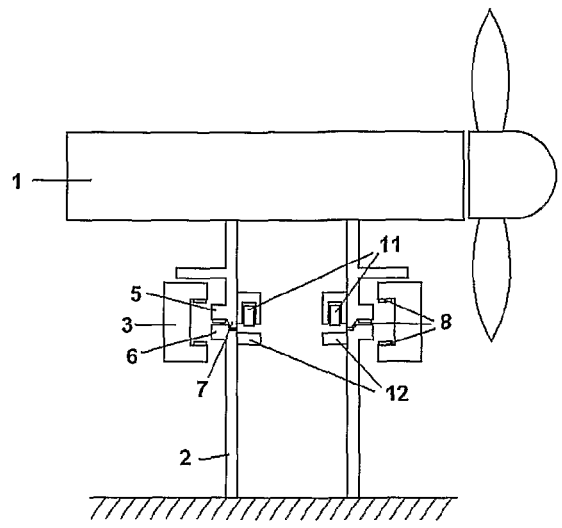
FIGS. 5a, 5b, and 5c illustrate a fifth embodiment of the present invention
Figure 5B:
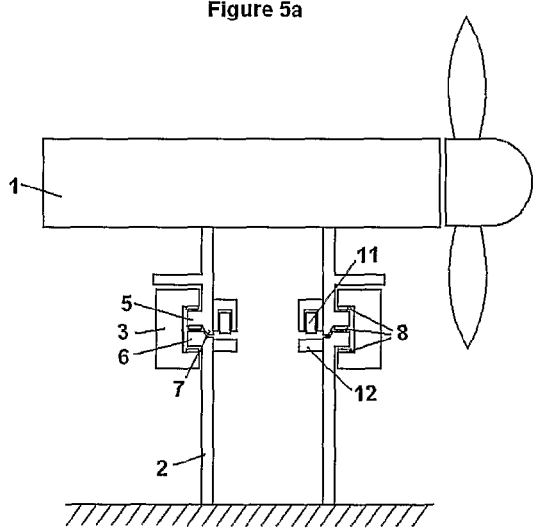
Figure 5C:
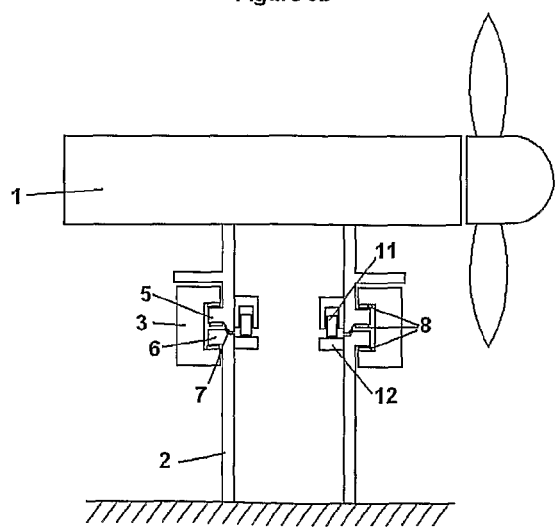

FIGS. 5a, 5b, and 5c show respective cross sections of a fifth embodiment in which additional brakes 11 are employed to prevent the yaw bearing form rotating. In FIG. 5a, the PGA 1 is mounted on the support structure 2 with the moveable elements 3 disengaged and the brakes 11 released. In FIG. 5b, the moveable elements 3 have been actuated radially inwards to secure the coupling (actuator not shown). In FIG. 5c, the brakes 11 have been applied to bear against features 12 on the support structure such that the PGA and support structure mating features 5 and 6 are prevented from rotating relative to one another about the vertical axis.

Figure 6A:
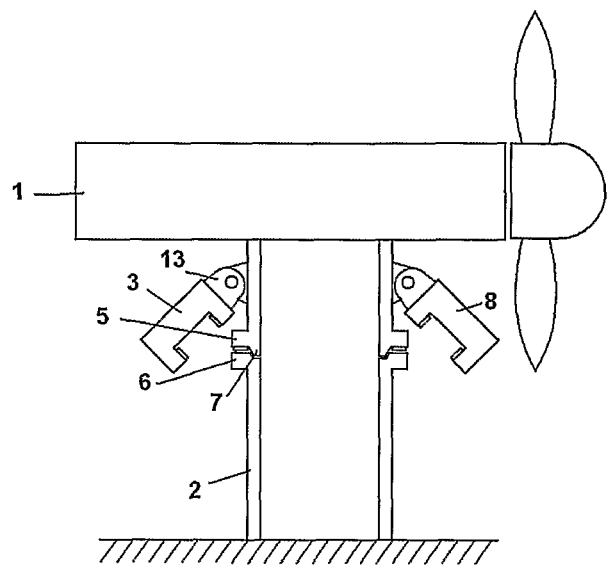
FIGS. 6a and 6b illustrate a sixth embodiment of the present invention.
Figure 6B:
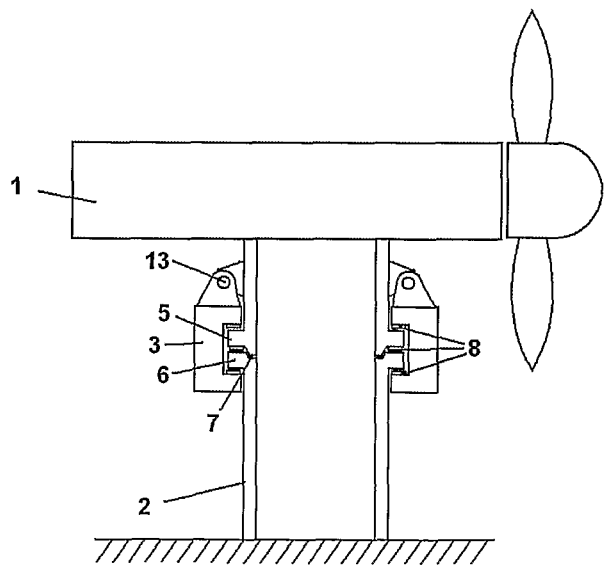

FIGS. 6a and 6b show respective cross sections of a sixth embodiment in which the moveable elements 3 of the detachable coupling are mounted from the PGA 1 on horizontal axis hinges 13. In FIG. 6a, the PGA 1 is mounted on the support structure 2 with the moveable elements 3 disengaged. In FIG. 6b, the moveable elements 3 have been actuated about their hinge mountings 13 to secure the coupling (actuator not shown).

Figure 7A:
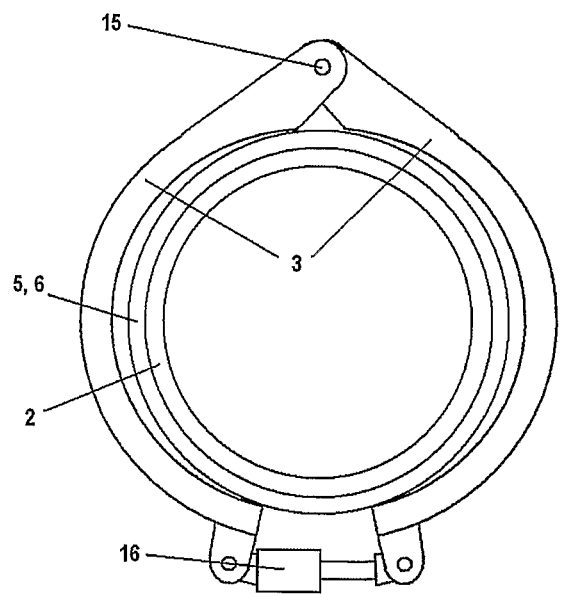
FIGS. 7a and 7b illustrate a first coupling for use in an embodiment of the present invention.
Figure 7B:
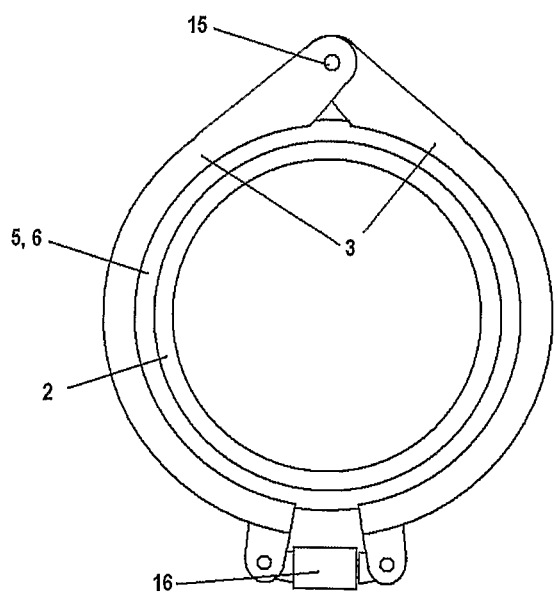

FIGS. 7a and 7b show a first example of a coupling suitable for use in an embodiment of the present invention, viewed looking up from the seabed (PGA 1 not shown, support structure 2 in cross section). In this example, the moveable elements 3 are linked together by a hinge 15 and driven by an actuator 16 to open and close the moveable elements around mating features 5 and 6 on the support structure 2 and PGA 1 by articulating the moveable elements 3 in a substantially horizontal plane. In FIG. 7a, the moveable elements 3 are open and in the disengaged (release) position. In this position, the PGA can be completely removed from the support structure. In FIG. 7b, the actuator 16 has been driven to engage the moveable elements 3 with the mating features 5 and 6 on the PGA 1 and support structure 2. Although FIGS. 7a and 7b show two moveable elements 3, it will be readily understood that the principles of this embodiment of the invention are equally applicable to three or more moveable elements hinged together. A single actuator, or multiple actuators, may be used.

Figure 8A:
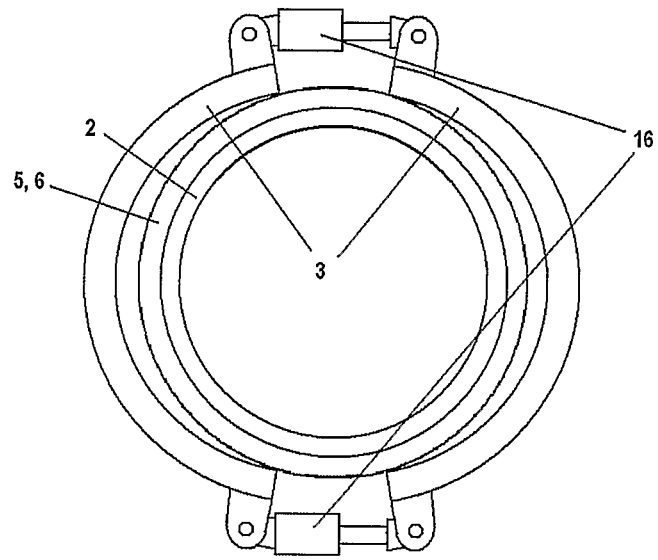
FIGS. 8a and 8b illustrate a second coupling for use in an embodiment of the present invention.
Figure 8B:
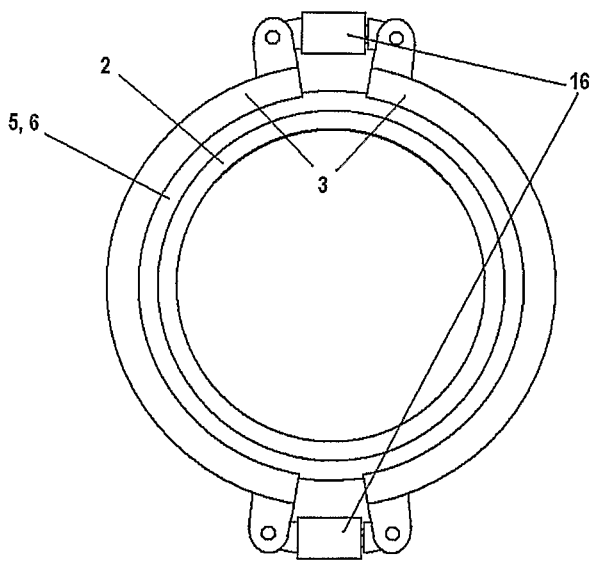

FIGS. 8a and 8b show a second coupling suitable for use in an embodiment of the present invention, again viewed looking up at the detachable coupling from the seabed (PGA 1 not shown, support structure 2 in cross section). In this example, the moveable elements 3 are not directly connected to each other but are linked by a pair of linear actuators 16. Together these actuators open and close the moveable elements 3 around mating features 5 and 6 on the support structure and PGA, acting in a predominantly horizontal plane. In FIG. 8a the moveable elements 3 are open and in the disengaged state. In this state the PGA can be completely removed from the support structure. In FIG. 8b the actuators 16 have been driven to engage the moveable elements 3 with the mating features 5 and 6 on the PGA and support structure. Although this Figure shows two moving elements and two actuators, it would be equally possible to use three or more moving elements and three or more actuators.

Figure 9A:
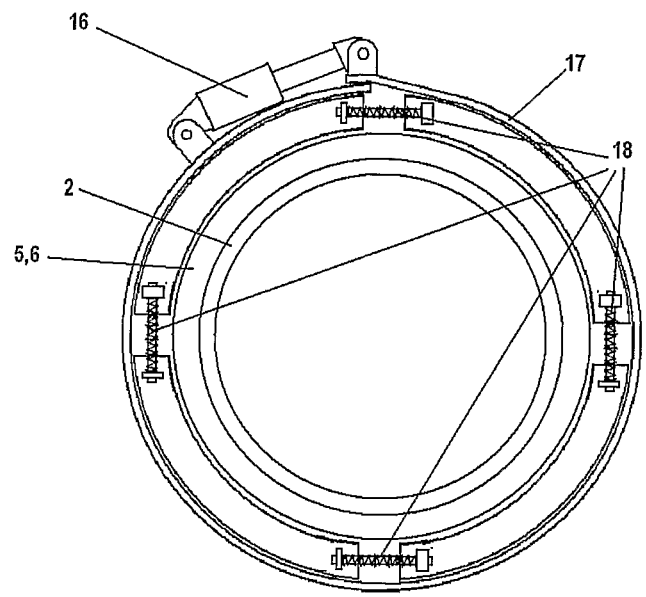
FIGS. 9a and 9b illustrate a third coupling for use in an embodiment of the present invention.
Figure 9B:
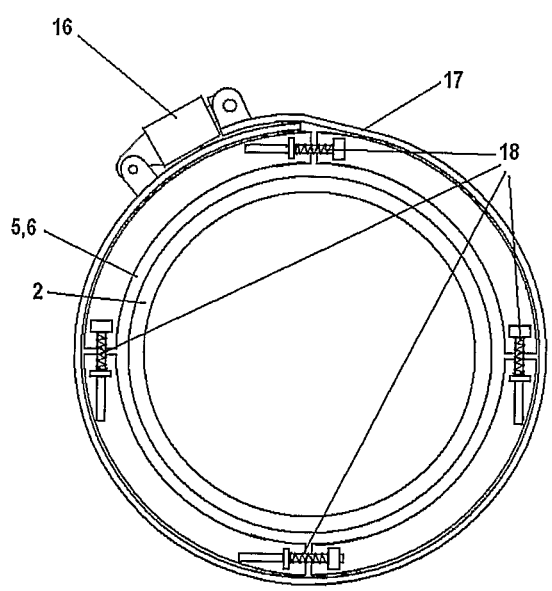

FIGS. 9a and 9b show a third coupling suitable for use in an embodiment of the present invention, again viewed looking up at the detachable coupling from the seabed (PGA 1 not shown, support structure 2 in cross section). In this example, the moveable elements 3 are loosely held together by a band clamp 17 which can be opened and closed by an actuator 16. Springs 18 mounted on the ends of each moveable element help them to disengage when the band clamp is released. In FIG. 9a the moveable elements 3 are open and in the disengaged state. In FIG. 9b the actuator 16 has been driven to close the band clamp 17 and engage the moveable elements 3 with the mating features 5 and 6 on the PGA and support structure. Although this Figure shows four mechanical elements, it would be equally possible to use two or more mechanical elements.

Figure 10A:
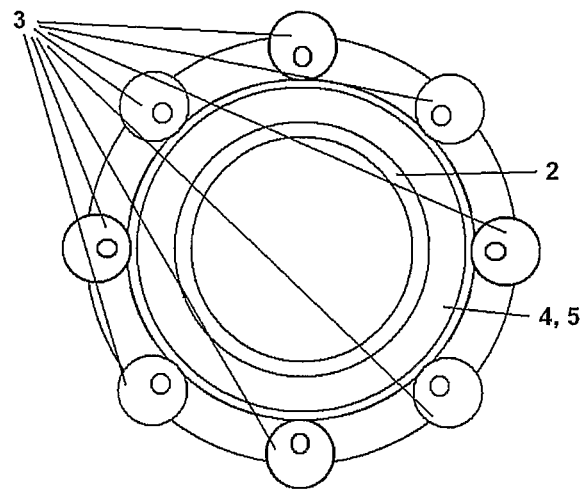
FIGS. 10a and 10b illustrate a fourth coupling for use in an embodiment of the present invention.
Figure 10B:
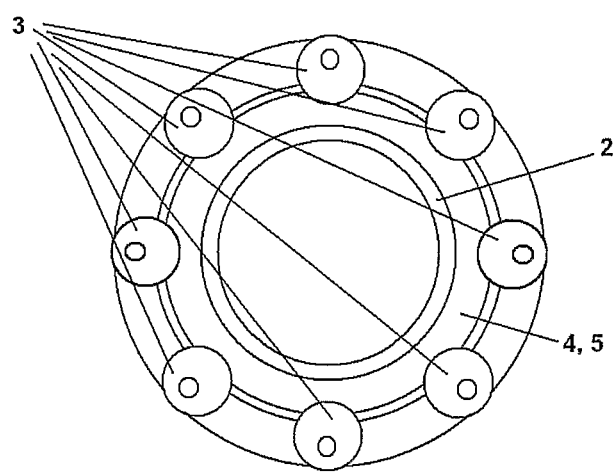

FIGS. 10a and 10b show a fourth coupling suitable for use in an embodiment of the present invention, again viewed looking up at the detachable coupling from the seabed (PGA not shown, support structure 2 in cross section). In this example, the moveable elements 3 are individual latches which rotate about their respective horizontal axes, driven by one or more actuators (not shown). In FIG. 10a the movable elements are open and in the disengaged state. In FIG. 10b the actuators have closed the mechanical elements 3 around the mating features 5 and 6 on the PGA and support structure. As before, it will be readily appreciated that any number of moveable elements could be used.

It should be noted that the features previously described can be used in any combination. By way of example, the moveable elements 3 described in FIG. 10 could be adapted such that they rotated outwards to engage the detachable clamp in the general manner described in FIG. 2. Alternatively and by way of a further example, the same moveable elements could incorporate a taper such that when actuated beyond the normal engaged position they performed the function of the integral brake described in FIG. 3.

As will be readily appreciated from the above description, embodiments of the present may have one or more of the following advantages:

The mechanical loads that have to be reacted by such a coupling can be very significant, particularly for a water current generator. By combining together the functions of a coupling and a bearing significant cost savings can be made compared to a system which uses a separate coupling and bearing, both of which would have to carry the loads. The combined coupling/bearing arrangement can also be simpler mechanically which improves the reliability of the system.

An embodiment can provide a simple and safe means of attaching a PGA to a submerged support structure in areas of strong water current or wave activity. The coupling and de-coupling operations can be carried out remotely without the need for diver intervention which can be hazardous in this environment. The fact that divers are not required also increases the maximum water depth in which the machine can be built and maintained safely.

The coupling can make use of relatively few actuators to engage the PGA with the support structure. It may not require a bolted flange to be made underwater with many individual bolts requiring accurate pre-tensioning.

In rough water conditions or when there is any current flowing it may be very difficult or impossible to control the orientation of the PGA about a vertical axis whilst it is being connected to the support structure. A coupling such as described above greatly simplifies and speeds up the process of connecting the PGA to the support structure, since the two can be mated together irrespective of the orientation of the PGA about a vertical axis.

Alignment guides can be used to help the PGA self align with the support structure as they are mated together. This makes the coupling tolerant to moderate misalignment of the PGA about a horizontal axis, as well as lateral misalignment. This also simplifies the process of connecting the PGA to the support structure, since the PGA does not require tensioned guide wires or hinged mechanical linkages fixed to the seabed in order to guide the PGA into position on the support structure.

No rolling elements are required as part of the bearing. The bearing can be naturally lubricated by sea water. This avoids the need for a separate lubrication system and sealing system for the bearing.

All moving elements or elements that could experience wear are recoverable to the surface with the PGA, making the system easy to maintain. Only passive structural components are left on the support structure.

The coupling can be manufactured without the need for tight tolerances normally associated with rolling element bearings. It is also tolerant to minor damage (e.g. sand abrasion or minor impact damage) during operation.

The invention claimed is:

1. An underwater structure comprising:
    a support structure;
    a power generating apparatus; and
    a coupling for coupling the power generating apparatus with the support structure, the coupling having a first configuration in which the power generating apparatus is removable from the support structure, and a second configuration in which the power generating apparatus is not removable from the support structure, wherein, in the second configuration, the coupling is arranged to allow the power generating apparatus to rotate with respect to the support structure about a substantially vertical axis thereof, and to transfer all other mechanical loads from the power generating apparatus to the support structure.

2. A structure as claimed in claim 1, wherein the coupling comprises:
an attachment portion for attaching the coupling to the power generating apparatus;
an engagement portion adapted for slidable engagement with a locating portion of the support structure; and
a clamp mechanism movable between a release position in which the power generating apparatus and the support structure are releasable from one another, and an engaged position in which the power generating apparatus and the support structure are not substantially releasable from one another.

3. A structure as claimed in claim 2, wherein the clamp mechanism comprises a first clamp portion, a second clamp portion rotatably attached to the first clamp portion, and an actuator operable to move the first and second clamp portions relative to one another between a release position and an engaged position.

4. A structure as claimed in claim 2, wherein the clamp mechanism comprises a first clamp portion, and a second clamp portion, wherein the first and second clamp portions are connected to one another by a pair of actuators which are operable to move the first and second clamp portions relative to one another between a release position and an engaged position.

5. A structure as claimed in claim 2, wherein the clamp mechanism comprises a band clamp to engage movable elements of the coupling with at least one mating feature of the power generating apparatus and support structure.

6. A structure as in claim 1, wherein the coupling can be engaged with and disengaged from the support structure irrespective of an orientation of the power generating apparatus about the substantially vertical axis.

7. A structure as in claim 1, further comprising a friction brake which is operable to prevent rotation of the power generating apparatus with respect to the support structure.

8. A structure as claimed in claim 7, wherein the friction brake is provided by the coupling.

9. A structure as in claim 1, further comprising a mechanical key operable to lock the rotational position of the power generating apparatus with respect to the support structure.

10. A structure as in claim 9, wherein the mechanical key is provided by the coupling.

11. A structure as in claim 1, wherein the power generating apparatus and support structure have respective mating features, which engage with one another, thereby transferring substantially horizontally acting loads directly between the power generating apparatus and the support structure, such that the coupling does not transfer such horizontal loads.

12. A structure as in claim 1, further comprising alignment guides adapted to align the power generating apparatus with the support structure.

13. A structure as in claim 1, wherein the coupling is operable to move radially outwardly or radially inwardly of the power generating apparatus in a substantially horizontal plane to engage with one or more features on the support structure.

14. A structure as in claim 1, further comprising a position stop to prevent the power generating apparatus rotating beyond a predetermined angle.

15. A structure as in claim 1, further comprising a pin or latch or equivalent mechanical lock adapted to prevent the coupling becoming inadvertently disengaged once it has been engaged, thereby preventing accidental release of the power generating apparatus from the support structure.

16. A coupling for coupling a power generating apparatus with a support structure, the coupling having, in use, a first configuration in which the power generating apparatus is removable from the support structure, and a second configuration in which the power generating apparatus is not removable from the support structure, wherein, in the second configuration, the coupling is arranged to allow the power generating apparatus to rotate with respect to the support structure about a substantially vertical axis thereof, and to transfer all other mechanical loads from the power generating apparatus to the support structure.

17. A coupling as claim 16, comprising:
an attachment portion for attaching the coupling to a power generating apparatus;
an engagement portion adapted for slidable engagement with a locating portion of a support structure; and
a clamp mechanism movable between a release position in which, in use, the power generating apparatus and the support structure are releasable from one another, and an engaged position in which, in use, the power generating apparatus and the support structure are not substantially releasable from one another.

18. A coupling as claimed in claim 17, wherein the clamp mechanism comprises a first clamp portion, a second clamp portion rotatably attached to the first clamp portion, and an actuator operable to move the first and second clamp portions relative to one another between a release position and an engaged position.

19. A coupling as claimed in claim 17, wherein the clamp mechanism comprises a first clamp portion, and a second clamp portion, wherein the first and second clamp portions are connected to one another by a pair of actuators which are operable to move the first and second clamp portions relative to one another between a release position and an engaged position.

20. A coupling as claimed in claim 17, wherein the clamp mechanism comprises a band clamp to engage movable elements of the coupling with at least one mating feature of a power generation apparatus and support structure.

21. A coupling as claimed in claim 17, further comprising a friction brake which, in use, is operable to prevent rotation of the power generating apparatus with respect to the support structure.

22. A coupling as in claim 17, further comprising a mechanical key which, in use is operable to lock the rotational position of the power generating apparatus with respect to the support structure.

* * * * *